2,863,920
Patented Dec. 9, 1958

2,863,920

PROCESS OF PREPARING HYDROBENZAMIDE

Eldred V. Welch, North Plainfield, N. J., assignor to General Aniline & Film Corporation, New York, N. Y., a corporation of Delaware No Drawing. Application July 26, 1956
Serial No. 600,155

4 Claims. (Cl. 260—566)

The invention here presented is a new and useful process for the preparation of hydrobenzamide by the treatment of benzaldehyde with gaseous ammonia.

Hydrobenzamide is a known substance, having the structural formula:

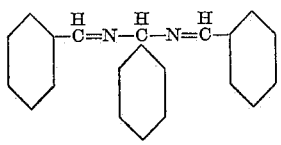

and many desirable properties which make it valuable for use in the synthesis of such compounds as m-nitrobenzaldehyde, 2,4,5-triphenylimidazolidine, and 2,4,6-triphenyl-1,3,5-triazine.

Several methods for the preparation of hydrobenzamide have been described in the literature. The first method described was that by Laurant (Ann. 21, 131) in which benzaldehyde was allowed to stand for 8 days in a closed tube in contact with liquid ammonia. Later (Rochleder, Ann. 41, 89) there appeared a procedure using the reaction between benzaldehyde and aqueous ammonia in a closed tube for a period of 24-48 hours. This method was modified (Francis, Ber. 42, 2216) by adding soap solution to emulsify the benzaldehyde. A more detailed and refined procedure is given in PB Report 73941, frame 8817. This process does not utilize an emulsifying agent, but the heating of the benzaldehyde and aqueous ammonia are carefully controlled and is continued for a period of 28 hours. Other modifications of this procedure utilize a solvent such as alcohol (Francis, Ber. 42, 2217) or ether (Ekman, Ann. 112, 175) for the benzaldehyde. Among other described procedures are the reaction of benzal chloride and ammonia (Engelhardt, Ann. 110, 78), of benzaldiacetate and aqueous ammonia (Wicke, Ann. 102, 368), and of benzaldehyde and magnesium amide iodide followed by decomposition of the reaction product with aqueous ammonium chloride (Oddo, Calderaro, Gazz. Chim. Ital. 53, 73), and the spontaneous formation of hydrobenzamide from bis-(α-hydroxybenzyl) amine on standing (Francis, Ber. 42, 2217).

None of these prior procedures, however, have been found to be entirely satisfactory, in part because of the slowness of the reaction, in part because of the poor yields, and in part because of the relatively small output of product per run from a large reaction vessel.

According to the present invention it is now found that if gaseous ammonia is simply bubbled through the benzaldehyde, an exothermic reaction occurs to form the desired hydrobenzamide, suitable cooling being applied to keep the temperature of reaction within the range between about 0° C. and about 100° C. However, I prefer to use a temperature below 50° C.

The reaction appears to be:

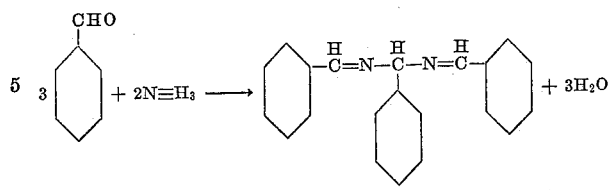

Thus the process of the present invention produces hydrobenzamide by the procedure of treating liquid benzaldehyde with gaseous ammonia at temperatures within the range between about 0° C. and about 100° C. to produce the desired hydrobenzamide in nearly quantitative amounts. Other objects and details will be apparent from the following description.

The first component of the invention is benzaldehyde, $C_6H_5CHO$. This compound is desirably used in as pure a condition as is convenient although it does not appear that the presence of minor amounts of impurities interferes to any great extent with the reaction.

The second component of the invention is gaseous ammonia; likewise desirably as pure as possible.

In practicing the invention, the liquid benzaldehyde is placed in a suitable reactor equipped with adequate and relatively powerful stirring means and also equipped with an adequate cooling jacket. The gaseous ammonia is delivered to the bottom of the reactor and bubbled through the benzaldehyde under conditions of good stirring. The reaction proceeds smoothly to yield the desired product, and the liquid benzaldehyde thickens from the presence of the hydrobenzamide until eventually the solid white crystalline hydrobenzamide is obtained. It is essential that the solid contents be well stirred, and broken up, in order that the ammonia may have ready access to all of the benzaldehyde. When the reaction is complete, as is shown by the failure to absorb any more ammonia, the refrigerating jacket may be drained and the material heated by vapor or low pressure steam to drive off the moisture which is present to yield a thoroughly dry product which is readily discharged from the reactor.

It may be noted that the ammonia may be used at atmospheric pressure, or at elevated pressures as desired, depending upon the strength of the reactor. Elevated pressures speed the reaction slightly but not always enough to justify the increased cost of the reactor. It may be noted that in any event, the procedure gives a yield which is almost 100% of the theoretical yield.

It may also be noted that the reaction, while adequately rapid is not instantaneous, and the production on a commercial scale may require from 6 to 14 hours for completion, with an hour or two more for the final drying. It is to be noted further that if a pure grade of benzaldehyde is used as the raw material, no purification steps are required to produce a fully satisfactory hydrobenzamide.

The following examples are offered as showing the preferred method of practicing the invention but are not intended to limit the claims in any way.

Example 1

Into a suitable reaction vessel charge 25 parts by weight of benzaldehyde. While keeping the temperature below 25° C., introduce somewhat more than the theoretical amount of gaseous ammonia under the surface of the liquid. After several hours stirring a solid mass of hydrobenzamide is formed. The product is dried in vacuum at 50–60° C. The yield is nearly quantitative.

Example 2

Into a suitable reaction vessel charge 159 parts by weight of benzaldehyde. Cool to 0-5° C. and pass into the top of the closed vessel 33 parts by weight of anhydrous gaseous ammonia over a period of 4 hours, keeping the temperature at 0-5° C. When all the ammonia has been added, warm to 40° C. during 4 hours and agitate at that temperature for 5 hours. During this heating period the liquid changes to a solid which is broken up by the agitator. After heating at 40° C. for 5 hours, remove the product and dry in vacuum at 50-60° C. The nearly white hydrobenzamide is obtained in nearly quantitative yield.

Example 3

Into a suitable reaction vessel charge 636 parts by weight of benzaldehyde. Close the vessel and evacuate to about 25 inches gauge pressure. Cool to 5-10° C. and at that temperature introduce 82 parts by weight of gaseous ammonia over a period of about 4 hours. Then heat in 2 hours to 40° C. and agitate at 40° C. for 8 hours. At the end of this time apply vacuum and distill out the water at 50-60° C. When the distillation becomes slow, raise the temperature to 70-80° C. to complete the drying. The hydrobenzamide is formed in nearly quantitative yield.

Thus the process of the present invention provides a very highgrade hydrobenzamide by a simple, convenient, easy and inexpensive reaction.

While there are above disclosed but a limited number of embodiments of the process of the invention it is possible to provide still other embodiments without departing from the inventive concept herein disclosed, and it is therefore desired that only such limitations be imposed upon the appended claims as are stated therein or required by the prior art.

The invention claimed is:

1. A process of preparing hydrobenzamide which comprises mixing, by vigorous agitation, liquid benzaldehyde with an amount of anhydrous gaseous ammonia at least sufficient to react with all of the benzaldehyde present, whereby an exothermic reaction takes place, cooling the mixture to a temperature between about 0° and 100° C. and maintaining said temperature during the agitation and until the reaction is complete, the agitation of the mixture being sufficiently vigorous to break up the solid hydrobenzamide formed by the reaction into small particles.

2. A process of preparing hydrobenzamide as recited in claim 1 wherein the temperature is maintained between 0° and 50° C.

3. A process of preparing hydrobenzamide which comprises placing a quantity of liquid benzaldehyde in a closed vessel, bubbling anhydrous gaseous ammonia through the benzaldehyde in said vessel in an amount in excess of the stoichiometric amount required to produce hydrobenzamide and simultaneously vigorously stirring said benzaldehyde, cooling the vessel to maintain the contents thereof at a temperature between 0° C. and 100° C. during the stirring, continuing the stirring until no more ammonia is absorbed and a solid hydrobenzamide in the form of broken particles is obtained, drying the solid hydrobenzamide thus obtained and removing the hydrobenzamide from the vessel.

4. A process of preparing hydrobenzamide which comprises placing a quantity of liquid benzaldehyde into a closed container, the quantity of liquid benzaldehyde being insufficient to completely fill the container, cooling the liquid to a temperature of 0° to 50° C. introducing into the container on top of the liquid therein an amount of anhydrous gaseous ammonia in excess of the stoichiometric amount necessary to produce hydrobenzamide, stirring the liquid while permitting the temperature to rise to below 50° C. and continuing the stirring at this temperature until the reaction is complete and solid hydrobenzamide is formed, removing the hydrobenzamide from the container and drying the hydrobenzamide under vacuum at a temperature of from 50° to 60° C.

References Cited in the file of this patent

Noller: Chemistry of Organic Compounds (1951), page 516.